Patented May 16, 1944

2,349,050

UNITED STATES PATENT OFFICE 2,349,050

CONTROL AND PREVENTION OF CAVING AND SLIDING IN DRILLING OIL AND GAS WELLS

Eldon A. Means, Wichita, Kans.

Application February 28, 1942, Serial No. 432,882

3 Claims. (Cl. 252—8.5)

The present invention relates to the drilling of oil and gas wells, where detrimental caving or sliding of shale and sand are likely to be encountered.

This application is a continuation in part of a copending application Ser. 351,188 filed Aug. 3, 1940.

The objects of the invention are to control and prevent such caving and sliding.

It has been found that muds in common use, such as the bentonites, actually encourage such sliding and caving, because they form hydrated films surrounding the formation particles. Such highly hydrated films act as lubricants, thus decreasing the angle of repose of the formation material and allowing more shale and sand to slide into the hole. Even the supposed strength of gelled bentonite is insufficient to hold these materials in place.

The present invention is based on the discovery that cohesive and adhesive properties can be measured by the pressure required to force the filter cake through a small orifice, together with an estimation of its ductility and that when such a pressure exceeds 10 lbs., with a $\frac{1}{32}$ inch orifice, the cohesive-adhesive and ductile character of the mud is sufficient to control or prevent sliding or caving.

The addition to drilling mud of compounds of the pyrophyllite type which are not excessively hydrated, provides the cohesive-adhesive-ductile character necessary to prevent caving and sliding.

These materials are characterized by an internal structure whose residual binding forces are such as to prevent the formation of thixotropic gel. On the other hand, such clay as native clay, kaolin, fuller's earth, or thermally decomposed clays lack sufficient hydration to give them the necessary adhesive-cohesive-ductile character.

The invention takes cognizance of the fact that there are three known types of hydration; first the wetting of the surface, second the hydration of the adsorbed ions, third the growth of a filamentous mass which encloses much water and produces a thixotropic solution.

Only hydration of the first and second kind together will produce the necessary adhesion-cohesion-ductility characteristics.

The accompanying diagram illustrates the structure of an alumino-silicate capable of acquiring hydration only of the first and second kind.

By the addition of such a material to drilling mud, it is possible to make it sufficiently adhesive, cohesive, and ductile to prevent caving and sliding of shale and sand formations.

For example, in a well 30 miles northwest of Oklahoma City, where caving or sliding was occurring and hampering operations, and where the mud consisted of a bentonite native clay mixture with a filter cake extrusion pressure of 5 lbs., 1000 lbs. of pyrophyllitic clay, with the illustrated structure was added to each 100 bbls. of mud. This brought the filter cake extrusion pressure up to 15 lbs., and the caving and sliding stopped. On removing this 15 lbs. extrusion pressure mud and returning to the use of bentonite the condition of caving and sliding recurred. Readdition of like amounts of this pyrophyllitic clay again stopped the objectionable caving and sliding.

The pyrophyllite used in the example given was obtained from deposite in Rush County, Kansas. The illustration given was derived from X-ray diffraction data obtained from this pyrophyllite and shown in this table:

| X-Ray diffraction pattern, dist. in cm. on film | Pyrophyllite, atomic distances in Angstrom units |
|---|---|
| 1.35 | 8.15 |
| 2.45 | 4.64 |
| 2.58 | 4.25 |
| 2.98 | 3.70 |
| 3.32 | 3.33 |
| 5.95 | 1.92 |
| 6.32 | 1.82 |
| 6.28 | 1.77 |
| 8.50 | 1.36 |
| 9.47 | 1.25 |
| 4.35 | 2.57 |
| 3.85 | 2.83 |
| 7.50 | 2.30 |
| 10.0 | 1.182 |

The invention however is not limited to this particular example.

The present invention is distinguished from that disclosed in copending patent application Ser. No. 351,188 filed Aug. 3, 1940, in that it involves a pyrophyllitic clay of cohesive, adhesive, ductile characteristics for controlling and preventing caving and sliding in drill holes, whereas the invention of the other patent application referred to involves the use of a high base exchange clay of the non-expanding type, mechanically dispersed to form a stable suspension in salt water and primarily intended for drilling in locations where salt water is encountered.

What is claimed is:

1. An aqueous drilling mud containing a cohesive-adhesive-ductile agent, comprising a pyrophyllitic aluminum silicate having substantially the illustrated chemical analysis and crystalline structure as represented by

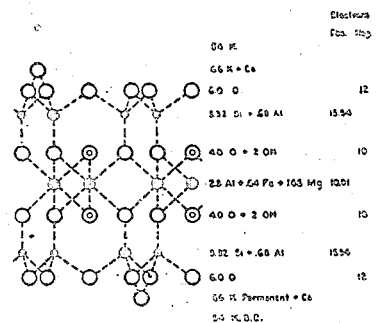

2. A method for controlling caving and sliding in oil well drilling, comprising incorporating in aqueous drilling mud, an adhesive-cohesive-ductile drilling agent, comprising a pyrophyllitic aluminum silicate with substantially the illustrated chemical analysis and crystalline structure represented by

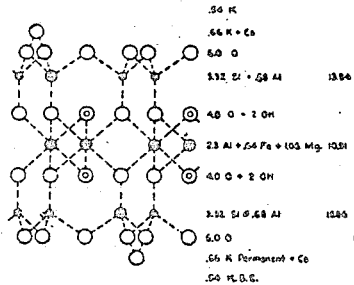

3. A method for increasing the adhesion, cohesion and ductility of aqueous drilling muds as measured by extrusion pressure of the filter cake, comprising incorporating in such mud a pyrophyllitic aluminum silicate having substantially the chemical analysis and crystalline structure represented by

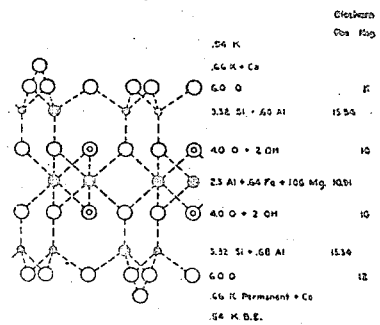

ELDON A. MEANS.